(12) United States Patent
Wang et al.

(10) Patent No.: US 10,655,719 B2
(45) Date of Patent: May 19, 2020

(54) ELECTRIC DEVICE WITH TORQUE VECTORING FUNCTION

(71) Applicant: Jilin University, Changchun (CN)

(72) Inventors: Junnian Wang, Changchun (CN); Bin Yang, Changchun (CN)

(*) Notice: Subject to any disclaimer, the term of this patent is extended or adjusted under 35 U.S.C. 154(b) by 167 days.

(21) Appl. No.: 15/959,220

(22) Filed: Apr. 21, 2018

(65) Prior Publication Data

US 2018/0306295 A1 Oct. 25, 2018

(30) Foreign Application Priority Data

Apr. 21, 2017 (CN) .......................... 2017 1 0266606

(51) Int. Cl.
| | | |
|---|---|---|
| *F16H 48/08* | (2006.01) | |
| *B60K 1/02* | (2006.01) | |
| *B60K 17/16* | (2006.01) | |
| *F16H 48/36* | (2012.01) | |
| *B60K 23/04* | (2006.01) | |
| *F16H 3/72* | (2006.01) | |

(52) U.S. Cl.
CPC ............... *F16H 48/08* (2013.01); *B60K 1/02* (2013.01); *B60K 17/165* (2013.01); *B60K 2023/043* (2013.01); *F16H 3/728* (2013.01); *F16H 2048/364* (2013.01); *F16H 2200/2017* (2013.01); *F16H 2200/2097* (2013.01)

(58) Field of Classification Search
CPC ...... B60K 1/00; B60K 1/02; B60K 2001/001; B60K 2023/043; B60K 2023/046; B60K 17/043; B60K 17/046; B60K 17/16; B60K 17/165; F16H 2200/201–2017; F16H 48/36; F16H 2048/364; F16H 23/04
See application file for complete search history.

(56) References Cited

U.S. PATENT DOCUMENTS

| | | | | |
|---|---|---|---|---|
| 7,442,141 B2* | 10/2008 | Yamauchi | ............... | B60L 50/52 475/6 |
| 9,638,302 B2* | 5/2017 | Smetana | ............... | F16H 63/304 |
| 9,855,830 B2* | 1/2018 | Knoblauch | ............... | B60K 1/00 |
| 2014/0080653 A1* | 3/2014 | Smetana | ............... | B60K 1/00 475/150 |
| 2016/0003337 A1* | 1/2016 | Smetana | ............... | F16H 48/36 475/5 |
| 2017/0023114 A1* | 1/2017 | Wang | ............... | B60K 1/00 |

* cited by examiner

*Primary Examiner* — David R Morris
*Assistant Examiner* — James J Taylor, II
(74) *Attorney, Agent, or Firm* — W&K IP

(57) ABSTRACT

Disclosed is an electric differential with a torque vectoring function. The electric differential includes: a main drive mechanism; a bevel gear differential; a TV control drive mechanism used for outputting control power; a first single-row planetary gear train, of which a first sun gear is coaxially and fixedly connected with a first half shaft and a first gear ring is connected with a control output end; a second single-row planetary gear train, of which a second gear ring is fixed to a drive axle housing, a second planet carrier is fixedly connected with a first planet carrier and a second sun gear is supported on the first half shaft through a bearing.

9 Claims, 8 Drawing Sheets

ELECTRIC DEVICE WITH TORQUE VECTORING FUNCTION

CROSS-REFERENCE TO RELATED APPLICATIONS

This application claims priority to Chinese Patent Application No. 201710266606.3 with a filing date of Apr. 21, 2017. The content of the aforementioned applications, including any intervening amendments thereto, are incorporated herein by reference.

TECHNICAL FIELD

The present invention belongs to the technical field of transmission of electric vehicles, and particularly relates to an electric differential with a torque vectoring function.

BACKGROUND OF THE PRESENT INVENTION

Due to the energy crisis and the increasing attention to environmental protection, a new energy automobile is the development direction of future automobiles. An electric automobile has been rapidly developed worldwide. Compared with a traditional internal combustion engine automobile, the electric automobile has better economy and environment friendliness, and has significant advantages in the environmental protection aspect due to the characteristic of almost zero emission. Meanwhile, due to the characteristics of a drive motor, such as rapid response, low speed, large torque and the like, the electric automobile has better acceleration performance; the rotation speed and the torque of the motor are easy to acquire; and the electric automobile may be controlled more accurately. Therefore, the electric automobile has great development potential.

The electric automobile is generally driven to run by adopting a power assembly composed of a motor and a drive axle or a power assembly composed of the motor, a transmission and the drive axle. Due to the defects of large unsprung mass, poor heat dissipation of a hub motor and the like, an electric automobile driven by the hub motor is not produced in large scale. Therefore, most of the power assemblies of existing electric automobiles include the drive axle.

A differential is an important component in the drive axle. Because of a "differential without differential torque" principle in the differential, a drive torque of the automobile may be only equally vectored to both sides of left and right wheels. In this way, ground adhesive force cannot be well utilized under the condition that ground adhesion is not uniform; and even slippage of the wheels and other unsteady running conditions may be easily caused on one side with low adhesion, so that the adhesive capability of drive wheels cannot be achieved. Meanwhile, when the automobile makes a turn at high speed, a load may be transferred from an inside wheel to an outside wheel. Even if the ground adhesion is good, the adhesive capability of the outside wheel may be higher than that of the inside wheel. At this moment, the torque is equally vectored to the inside and outside wheels by the traditional differential, which may cause that the inside wheel reaches an adhesion limit and slips, and the automobile is instable. If part of the torque of the inside wheel is transferred to the outside wheel, lateral force margin of the inside wheel may be increased to prevent the wheels from slipping, and an additional yawing moment may be generated for the complete vehicle. The yawing moment may help to promote and guide the vehicle to turn, thereby increasing turning maneuverability and ultimate turning capability of the vehicle. At present, the technology is applied to some high-end sports cars and high-grade SUVs in a form of a torque vectoring differential, such as a super handling all-wheel drive system (SH-AWD) developed by Honda Company, a super active yawing control (SAYC) system developed by Mitsubishi Corporation, and the like. However, the technology is not widely applied in the electric automobile.

SUMMARY OF PRESENT INVENTION

A purpose of the present invention is to provide an electric differential with a torque vectoring function, for overcoming the defect that left and right output torques of a differential are equal and cannot be regulated.

A technical solution provided by the present invention is as follows:

An electric differential with a torque vectoring function includes:

a main drive mechanism arranged on one side of a differential, wherein an output end of the main drive mechanism is connected with a differential housing for transferring rotating power to the differential housing to drive a vehicle to run;

a TV control drive mechanism arranged on the other side of the differential for outputting torque vectoring control power;

a first single-row planetary gear train including a first sun gear, a first planetary gear, a first planet carrier and a first gear ring, wherein the first sun gear is coaxially and fixedly connected with a first half shaft, and the first gear ring is connected with an output end of the TV control drive mechanism;

a second single-row planetary gear train including a second sun gear, a second planetary gear, a second planet carrier and a second gear ring, wherein the second gear ring is fixed to a drive axle housing, the second planet carrier is fixedly connected with the first planet carrier, and the second sun gear is rotatably supported on the first half shaft; and a third single-row planetary gear train including a third sun gear, a third planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein the second single-row planetary gear train and the first single-row planetary gear train have the same characteristic parameter.

Preferably, the TV control drive mechanism includes a TV control motor and a TV reducing mechanism.

Preferably, the TV reducing mechanism includes:

a fourth single-row planetary gear train including a fourth sun gear, a fourth planetary gear, a fourth planet carrier and a fourth gear ring, wherein the fourth sun gear is fixedly connected with the hollow output shaft, and the fourth gear ring is fixed to the drive axle housing; and a fifth single-row planetary gear train including a fifth sun gear, a fifth planetary gear, a fifth planet carrier and a fifth gear ring, wherein the fifth sun gear is fixedly connected with the fourth planet carrier, the fifth gear ring is fixed to the drive axle housing, and the fifth planet carrier as a control output end is connected with the first gear ring.

Preferably, the main drive mechanism includes a main drive motor and a main reducing mechanism.

Preferably, the TV control motor includes a hollow output shaft; and the first half shaft is rotatably supported on the hollow output shaft and penetrates out of the hollow output shaft Preferably, the main reducing mechanism includes:

a seventh single-row planetary gear train including a seventh sun gear, a seventh planetary gear, a seventh planet carrier and a seventh gear ring, wherein the seventh sun gear is fixedly connected with an output shaft of the main drive motor, and the seventh gear ring is fixed to the drive axle housing; and a sixth single-row planetary gear train including a sixth sun gear, a sixth planetary gear, a sixth planet carrier and a sixth gear ring, wherein the sixth sun gear is fixedly connected with the seventh planet carrier, the sixth gear ring is fixed to the drive axle housing, and the sixth planet carrier is fixedly connected with the differential housing.

Preferably, the main drive motor includes a hollow output shaft; and a second half shaft is rotatably supported on the hollow output shaft and penetrates out of the hollow output shaft.

An electric differential with a torque vectoring function includes:

a main drive mechanism arranged on one side of a differential, wherein an output end of the main drive mechanism is connected with a differential housing for transferring rotating power to the differential housing to drive a vehicle to run;

a TV control drive mechanism arranged on the other side of the differential for outputting torque vectoring control power;

a first single-row two-stage planetary gear train including a first sun gear, a first two-stage planetary gear, a first planet carrier and a first gear ring, wherein the first sun gear is coaxially and fixedly connected with a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, the second planet carrier is fixedly connected with the first planet carrier, and the second sun gear is rotatably supported on the first half shaft; and a third single-row planetary gear train including a third sun gear, a third planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein the second single-row two-stage planetary gear train and the first single-row two-stage planetary gear train have the same characteristic parameter.

An electric differential with a torque vectoring function includes:

a main drive mechanism arranged on one side of a differential, wherein an output end of the main drive mechanism is connected with a differential housing for transferring rotating power to the differential housing to drive a vehicle to run;

a TV control drive mechanism arranged on the other side of the differential for outputting torque vectoring control power;

a first single-row planetary gear train including a first sun gear, a first planetary gear, a first planet carrier and a first gear ring, wherein the first sun gear is coaxially and fixedly connected with a first half shaft, and the first gear ring is connected with an output end of the TV control drive mechanism;

a second single-row planetary gear train including a second sun gear, a second planetary gear, a second planet carrier and a second gear ring, wherein the second gear ring is fixed to a drive axle housing, the second planet carrier is fixedly connected with the first planet carrier, and the second sun gear is rotatably supported on the first half shaft; and a third single-row two-stage planetary gear train including a third sun gear, a third two-stage planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein the second single-row planetary gear train and the first single-row planetary gear train have the same characteristic parameter.

An electric differential with a torque vectoring function includes:

a main drive mechanism arranged on one side of a differential, wherein an output end of the main drive mechanism is connected with a differential housing for transferring rotating power to the differential housing to drive a vehicle to run;

a TV control drive mechanism arranged on the other side of the differential for outputting torque vectoring control power;

a first single-row two-stage planetary gear train including a first sun gear, a first two-stage planetary gear, a first planet carrier and a first gear ring, wherein the first sun gear is coaxially and fixedly connected with a first half shaft, and the first gear ring is connected with an output end of the TV control drive mechanism;

a second single-row two-stage planetary gear train including a second sun gear, a second two-stage planetary gear, a second planet carrier and a second gear ring, wherein the second gear ring is fixed to a drive axle housing, the second planet carrier is fixedly connected with the first planet carrier, and the second sun gear is rotatably supported on the first half shaft; and a third single-row two-stage planetary gear train including a third sun gear, a third two-stage planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein the second single-row two-stage planetary gear train and the first single-row two-stage planetary gear train have the same characteristic parameter.

The present invention has beneficial effects as follows:

1, the electric differential with the torque vectoring function provided in the present invention overcomes the defect of "differential without differential torque" in the differential in the traditional drive axle and may vector drive torques of the automobile to wheels on the left and right sides according to the control need of control logic. On premise of not changing the total longitudinal drive torque, the function of unequal vectoring of the torques to the wheels on the left and right sides is realized, thereby increasing the turning maneuverability and driving pleasure of the vehicle;

2, according to the electric differential with the torque vectoring function provided in the present invention, the TV control motor and the main drive motor are coaxially arranged, so that the structure is more compact and an arrangement space is reduced; and 3, according to the electric differential with the torque vectoring function provided in the present invention, the mass belongs to the sprung mass. Therefore, unlike a hub motor, the unsprung mass will not be obviously increased, so a smoothness influence is small during running of the automobile.

DETAILED DESCRIPTION OF PREFERRED EMBODIMENTS

The present invention is further described below in detail in combination with drawings to enable those skilled in the art to implement the present invention with reference to words in the description.

Embodiment 1

Figure 1:
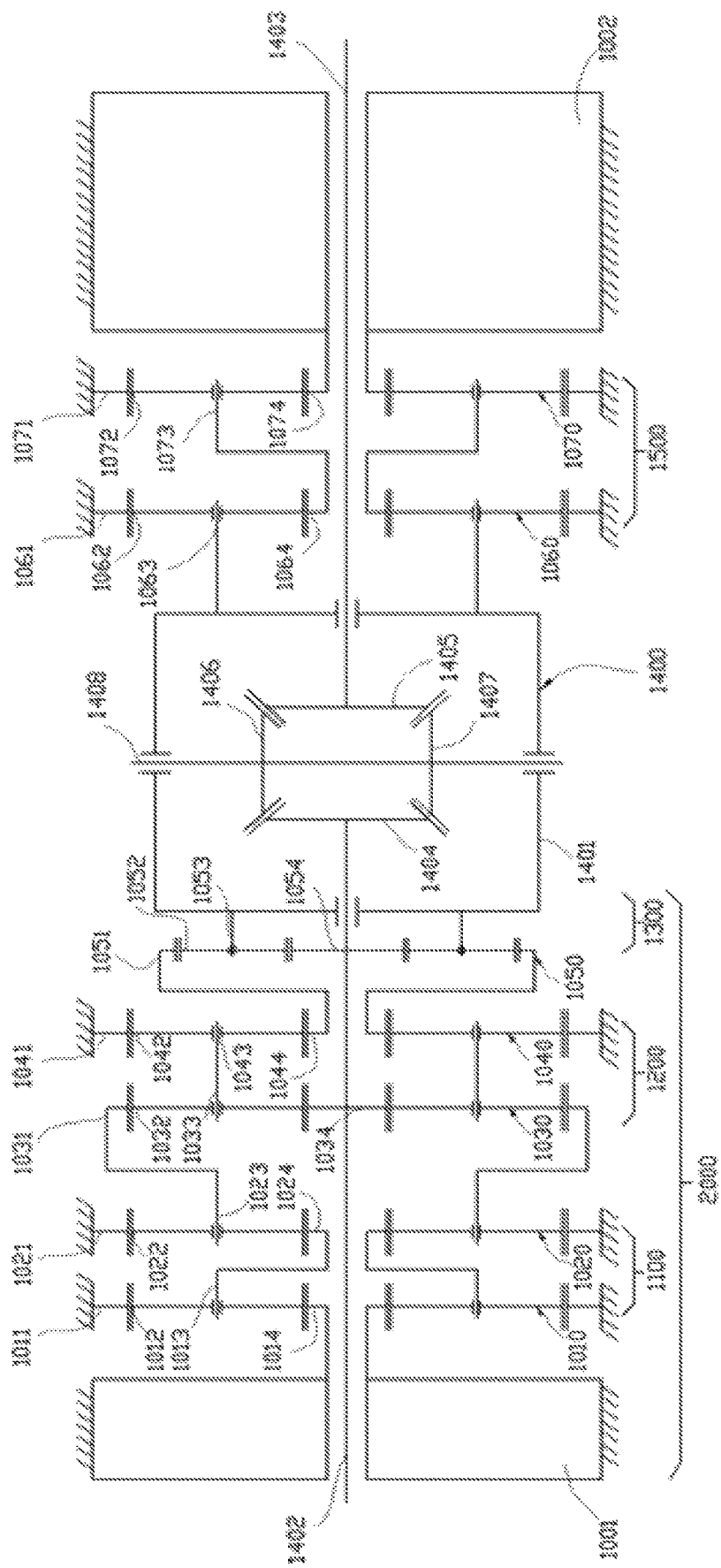
FIG. 1 is a structural schematic diagram of an electric differential with a torque vectoring function in embodiment 1 of the present invention.

As shown in FIG. 1, the present invention provides an electric differential with a torque vectoring function, and is mainly composed of a torque vectoring device 2000, a traditional bevel gear differential 1400, a main drive motor reducing mechanism 1500 and a main drive motor 1002.

In the present embodiment, the torque vectoring device 2000 is positioned on a left side of the drive axle (and can also be arranged on a right side of the drive axle by changing position with the main drive motor 1002) and mainly composed of a TV control motor 1001, a TV reducing mechanism 1100, a two-row planetary TV coupling mechanism 1200 and a single-row planetary differential coupling mechanism 1300.

The TV control motor 1001 is a hollow shaft type inner rotor motor and is connected with a first half shaft 1402 of a wheel on the left side to penetrate out of a hollow rotor shaft inner hole; a hollow shaft type inner rotor is connected with a sun gear 1014 of a fourth planetary gear train 1010 by a spline; and an output torque of the TV control motor 1001 is inputted to the fourth planetary gear train 1010. The TV control motor 1001 is supported on the first half shaft 1402 by a bearing, and a stator and a housing of the TV control motor 1001 are fixed with a drive axle housing.

The TV reducing mechanism 1100 mainly includes the fourth planetary gear train 1010 and a fifth planetary gear train 1020. The fourth planetary gear train 1010 includes the sun gear 1014, three planetary gears 1012 distributed along a circumference uniformly, a planet carrier 1013 and an inner gear ring 1011 fixed to the drive axle housing. The sun gear 1014 is connected with the hollow shaft type inner rotor of the TV control motor 1001 by a spline, and the planet carrier 1013 and a sun gear 1024 of the fifth planetary gear train 1020 are formed into a whole. The fifth planetary gear train 1020 includes a sun gear 1024, three planetary gears 1022 distributed along a circumference uniformly, a planet carrier 1023 and an inner gear ring 1021 fixed to the drive axle housing. The sun gear 1024 is supported on the first half shaft 1402 by a bearing, and the planet carrier 1023 and an inner gear ring 1031 of a first planetary gear train 1030 are formed into a whole.

Preferably, the TV reducing mechanism 1100 may be composed of a single-row planetary gear train, a multi-row planetary gear train or reducing mechanisms of other forms. Therefore, transformation of the form of the reducing mechanism 1100 is not regarded as the innovation of the present invention.

The two-row planetary TV coupling mechanism 1200 mainly includes the first planetary gear train 1030 and a second planetary gear train 1040. The first planetary gear train 1030 and the second planetary gear train 1040 must have the same planetary row characteristic parameters and consistent types of the planetary rows. The first planetary gear train 1030 includes a sun gear 1034, three planetary gears 1032 distributed along a circumference uniformly, the planet carrier 1033 and the inner gear ring 1031, wherein the inner gear ring 1031 and the planet carrier 1023 of the fifth planetary gear train 1020 are formed into a whole, the sun gear 1034 and the first half shaft 1402 are connected by a spline, and the planet carrier 1033 and the planet carrier 1043 of the second planetary gear train 1040 are formed into a whole. The second planetary gear train 1040 includes the sun gear 1044, three planetary gears 1042 distributed along a circumference uniformly, a planet carrier 1043 and an inner gear ring 1041 fixed to the drive axle housing, wherein the sun gear 1044 and the inner gear ring 1051 of the third planetary gear train 1050 are formed into a whole, and the sun gear 1044 is supported on the first half shaft 1402 by the bearing.

The single-row planetary differential coupling mechanism 1300 is mainly composed of the third planetary gear train 1050. The third planetary gear train 1050 includes a sun gear 1054, three planetary gears 1052 distributed along a circumference uniformly, a planet carrier 1053 and the inner gear ring 1051, wherein the sun gear 1054 and the first half shaft 1402 are connected by a spline, the inner gear ring 1051 and the sun gear 1044 of the second planetary gear train 1040 are formed into a whole, and the planet carrier 1053 is fixed to a differential housing 1401.

The traditional bevel gear differential 1400 is mainly composed of the differential housing 1401, the first half shaft 1402, a second half shaft 1403, a first half shaft gear 1404, a second half shaft gear 1405, two planetary bevel gears 1406 and 1407, and a planetary gear shaft 1408, wherein the first half shaft gear 1404 is connected with the first half shaft 1402 by a spline, the second half shaft gear 1405 is connected with the second half shaft 1403 by a spline, and the differential housing 1401 is supported on the second half shaft 1403 by a bearing.

The main drive motor reducing mechanism 1500 is positioned on the right side of the drive axle and mainly composed of a sixth planetary gear train 1060 and a seventh planetary gear train 1070. The sixth planetary gear train 1060 includes a sun gear 1064, three planetary gears 1062 distributed along a circumference uniformly, a planet carrier 1063 and an inner gear ring 1061 fixed to the drive axle housing, wherein the planet carrier 1063 and the differential housing 1401 are formed into a whole, the sun gear 1064 and a planet carrier 1073 of the seventh planetary gear train 1070 are formed into a whole, and the sun gear 1064 is supported on the second half shaft 1403 by a bearing. The seventh planetary gear train 1070 includes a sun gear 1074, three planetary gears 1072 distributed along a circumference uniformly, a planet carrier 1073 and an inner gear ring 1071 fixed to the drive axle housing, wherein the sun gear 1074 is connected with the hollow inner rotor shaft of the main drive motor 1002 by a spline.

Preferably, the main drive motor reducing mechanism 1500 may be composed of a single-row planetary gear train, a multi-row planetary gear train or reducing mechanisms of other forms. Therefore, transformation of the form of the main drive motor reducing mechanism 1500 is not regarded as the innovation of the present invention.

The main drive motor 1002 is positioned on the right side of the drive axle, is a hollow shaft type inner rotor motor and is connected with the second half shaft 1403 of a wheel on the right side to penetrate out of a hollow rotor shaft inner hole. A hollow shaft type inner rotor is connected with the sun gear 1074 of a seventh planetary gear train 1070 by a spline. A drive torque may be inputted into the main drive motor reducing mechanism 1500 by the main drive motor 1002 through the sun gear 1074, acts on the differential housing 1401 and is finally equally vectored to the first half shaft 1402 and the second half shaft 1403. The main drive motor 1002 is supported on the second half shaft 1403 by the bearing, and a stator and a housing of the main drive motor 1002 are fixed with the drive axle housing.

Embodiment 2

Figure 2:
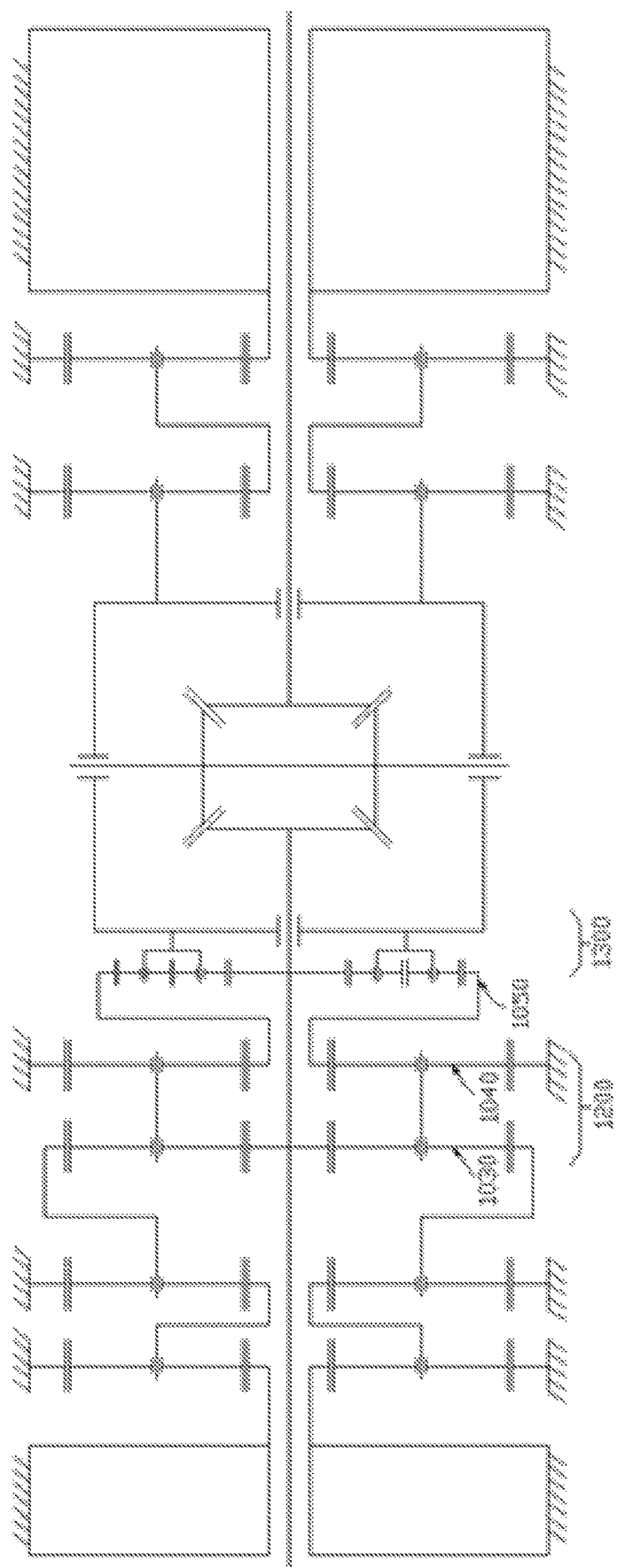
FIG. 2 is a structural schematic diagram of an electric differential with a torque vectoring function in embodiment 2 of the present invention.

As shown in FIG. 2, in the present embodiment, the first planetary gear train 1030 and the second planetary gear train 1040 in the two-row planetary TV coupling mechanism 1200 are single-row planetary gear trains, and the third planetary gear train 1050 in the single-row planetary differential coupling mechanism 1300 is a two-stage planetary gear train. The structural simplified diagram is shown in the figure.

Embodiment 3

Figure 3:
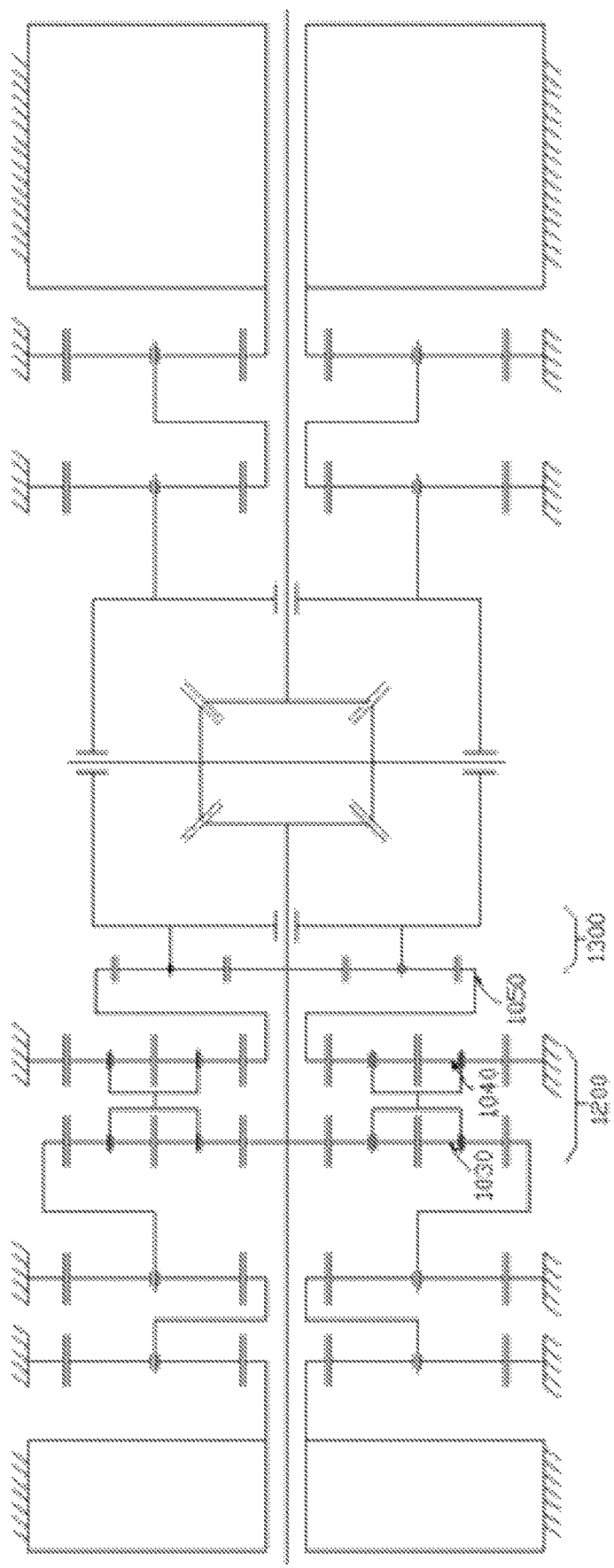
FIG. 3 is a structural schematic diagram of an electric differential with a torque vectoring function in embodiment 3 of the present invention.

As shown in FIG. 3, in the present embodiment, the first planetary gear train 1030 and the second planetary gear train 1040 in the two-row planetary TV coupling mechanism 1200 are two-stage planetary gear trains, and the third planetary gear train 1050 in the single-row planetary differential coupling mechanism 1300 is a single-row planetary gear train. The structural simplified diagram is shown in the figure.

Embodiment 4

Figure 4:
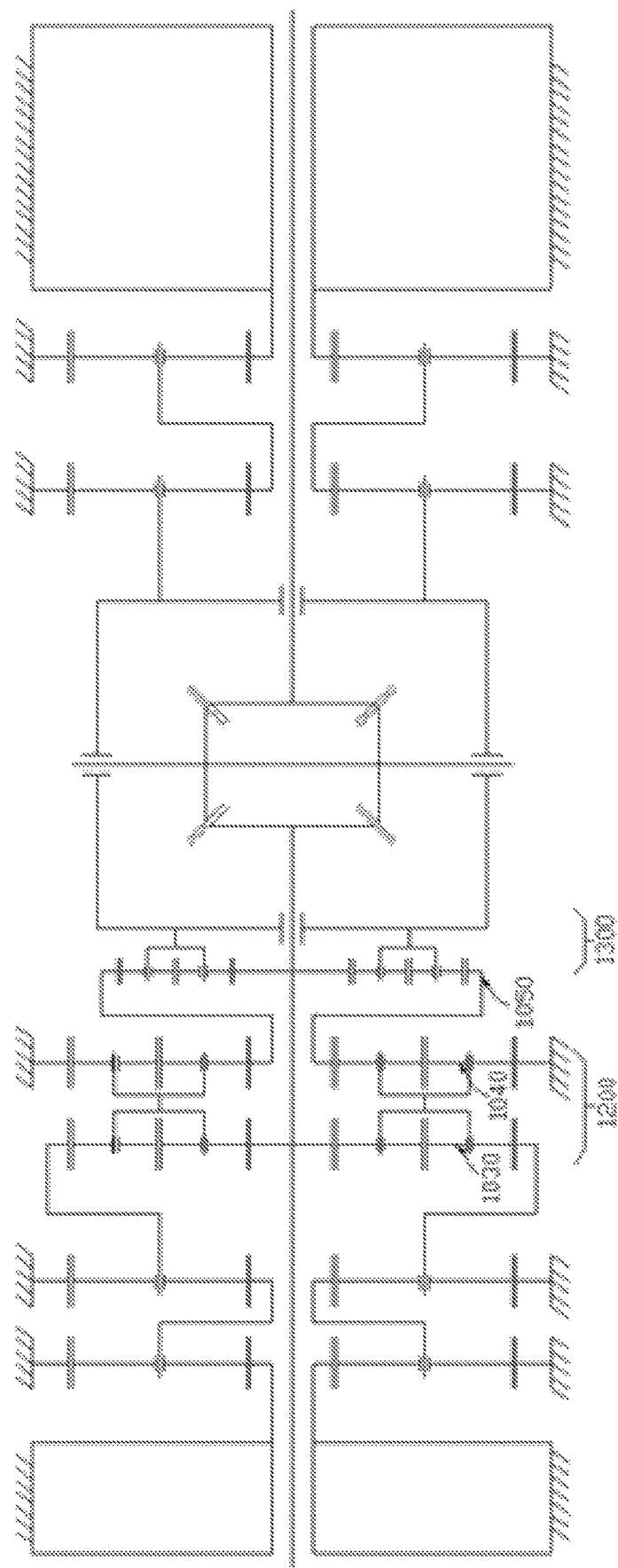
FIG. 4 is a structural schematic diagram of an electric differential with a torque vectoring function in embodiment 4 of the present invention.

As shown in FIG. 4, in the present embodiment, the first planetary gear train 1030 and the second planetary gear train 1040 in the two-row planetary TV coupling mechanism 1200 are two-stage planetary gear trains, and the third planetary gear train 1050 in the single-row planetary differential coupling mechanism 1300 is a two-stage planetary gear train. The structural simplified diagram is shown in the figure.

Solutions shown in FIGS. 1-4 are realizable embodiment structure solutions of an electric differential with a torque vectoring function in the present invention. However, in consideration of system inertia loss and running efficiency, an embodiment solution shown in FIG. 1 is an optimal solution, a less-preferred solution is the solution shown in FIG. 3, and then are the solutions shown in FIG. 2 and FIG. 4.

Operating principles of the electric differential with the torque vectoring function in the present invention are as follows:

The operating principles are described by taking the structural simplified diagram of the embodiment of the electric differential with the torque vectoring function shown in FIG. 1 as an example.

Figure 5:
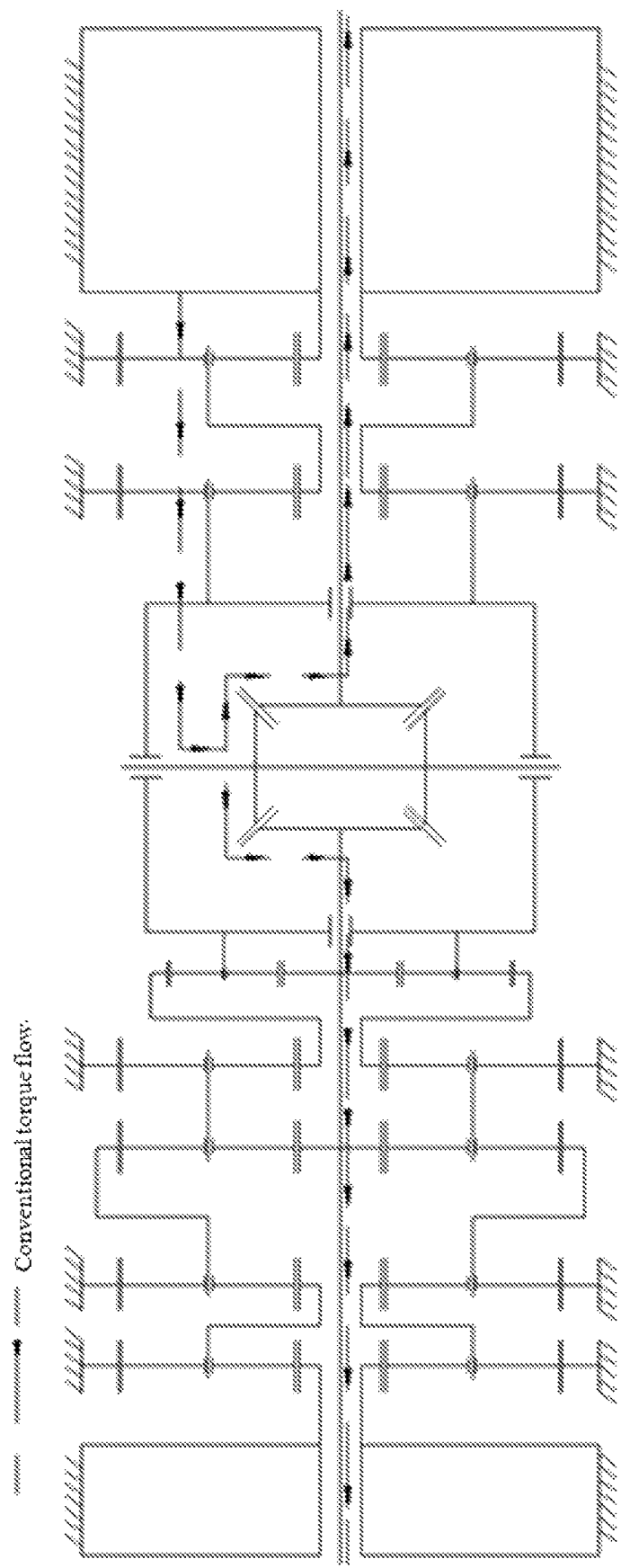
FIG. 5 is a schematic diagram of a torque flow direction of an electric differential with a torque vectoring function when an automobile goes straight in the present invention.

When an automobile goes straight, wheels on the left and right sides have the same drive torques, and torque vectoring is not needed. Therefore, the TV control motor 1001 has no control electrical signal; the TV control motor is not started; and the automobile is driven only by the main drive motor 1002. The torque outputted by the main drive motor 1002 is increased by the main drive motor reducing mechanism 1500, and acts on the differential housing 1401. Due to an equal vectoring principle of the torque of the traditional bevel gear differential mechanism 1400, the torque that acts on the differential housing 1401 is equally vectored to the first half shaft 1402 and the second half shaft 1403 so as to drive the automobile to run. If the rotating direction of the wheel during drive of the automobile is set as a positive direction, an opposite direction is a negative direction. At this moment, the differential housing 1401, the first half shaft 1402 and the second half shaft 1403 have the same rotation speed; and the planetary gears 1052 of the third planetary gear train 1050 only revolve with the differential housing 1401 and do not rotate. Therefore, the inner gear ring 1051 and the sun gear 1054 rotate at equal speed. Because the sun gear 1034 of the first planetary gear train 1030 and the sun gear 1054 of the third planetary gear train 1050 have the same rotation speed and the sun gear 1044 of the second planetary gear train 1040 and the inner gear ring 1051 of the third planetary gear train 1050 are formed into a whole, the sun gear 1034 in the first planetary gear train 1030 and the sun gear 1044 in the second planetary gear train 1040 rotate at equal speed. Because the first planetary gear train 1030 and the second planetary gear train 1040 share one planet carrier and two sun gears also have the same rotation speed, the inner gear ring 1031 and the inner gear ring 1041 have the same rotation speed. The inner gear ring 1041 is fixed and has a rotation speed of 0. Thus, the inner gear ring 1031 also has a rotation speed of 0. The TV reducing mechanism 1100 only changes the torque size outputted by the TV control motor 1001 and does not change the positive direction and the negative direction of the outputted torque. Therefore, when the automobile goes straight, an inner rotor of the TV control motor 1001 also has a rotation speed of 0; the TV control motor is not started and does not output the torque; and the automobile is driven only by the main drive motor 1002. A torque vectoring flow is shown in FIG. 5.

When the automobile makes normal differential turning, wheels on the left and right sides have the same drive torques, and torque vectoring is not needed. Therefore, the TV control motor 1001 has no control electrical signal; the TV control motor is not started; and the automobile is driven only by the main drive motor 1002. The torque outputted by the main drive motor 1002 is increased by the main drive motor reducing mechanism 1500, and acts on the differential housing 1401. Due to an equal vectoring principle of the torque of the traditional bevel gear differential mechanism 1400, the torque that acts on the differential housing 1401 is equally vectored to the first half shaft 1402 and the second half shaft 1403 so as to drive the automobile to run.

By taking normal differential left turning of the automobile as an example, if the rotation direction of the wheel during drive of the automobile is set as a positive direction, an opposite direction is a negative direction. For the third planetary gear train 1050, the formula of the rotation speed of the single-row planetary gear train is:

$$n_{S5} + k_5 n_{S5} - (k_5+1) n_{PC5} = 0$$

In the formula, $n_{S5}$ is the rotation speed of the sun gear 1054 of the third planetary gear train 1050; $n_{R5}$ is the rotation speed of the inner gear ring 1051 of the third planetary gear train; $n_{PC5}$ is the rotation speed of the planet carrier 1053 of the third planetary gear train; and $k_5$ is a planetary row characteristic parameter of the third planetary gear train. Because the automobile turns left, the rotation speed of the differential housing 1401 is greater than the rotation speed of the first half shaft 1402 and then:

$$n_{S5} < n_{PC5}$$

then:

$$n_{S5} < n_{R5}$$

Namely, the rotation speed of the sun gear 1054 in the third planetary gear train 1050 is smaller than the rotation speed of the inner gear ring 1051. Thus, in the two-row planetary TV coupling mechanism 1200, the rotation speed of the sun gear 1034 in the first planetary gear train 1030 is smaller than the rotation speed of the sun gear 1044 in the second planetary gear train 1040. Because the first planetary gear train 1030 and the second planetary gear train 1040 share one planet carrier, the two-row planetary TV coupling mechanism 1200 has:

$$n_{S3} + k n_{R3} = n_{S4} + k n_{R4}$$

In the formula, $n_{S3}$ is the rotation speed of the sun gear 1034 of the first planetary gear train 1030; $n_{R3}$ is the rotation speed of the inner gear ring 1031 in the first planetary gear train 1030; $n_{S4}$ is the rotation speed of the sun gear 1044 of the second planetary gear train 1040; $n_{R4}$ is the rotation speed of the inner gear ring 1041 in the second planetary gear train 1040; and k is a planetary row characteristic parameter of the first planetary gear train 1030 and the second planetary gear train 1040. Because:

$$n_{S3} < n_{S4} \text{ and } n_{R4} = 0,$$

$n_{R3} > 0$ is obtained.

Figure 6:
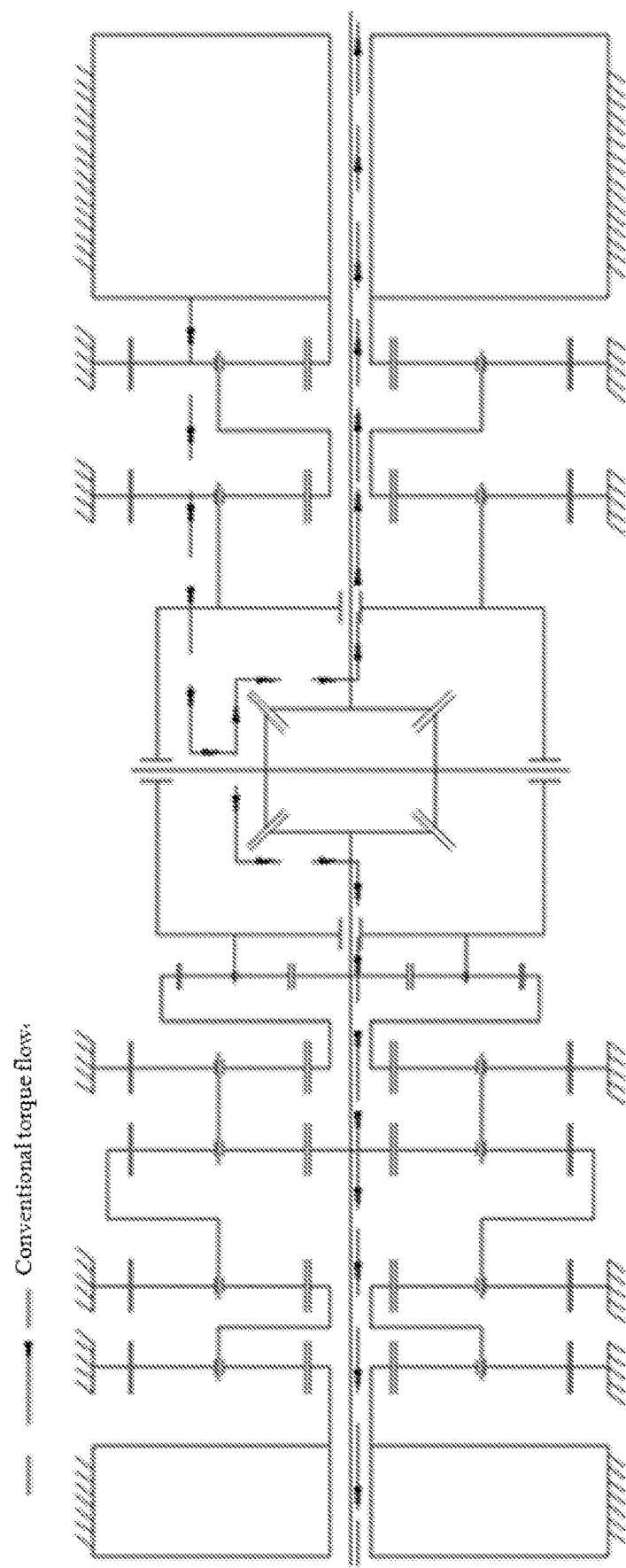
FIG. 6 is a schematic diagram of a torque flow direction of an electric differential with a torque vectoring function when an automobile normally turns in the present invention.

Namely, the rotation speed of the inner gear ring 1031 in the first planetary gear train 1030 is positive, so the rotation speed of the inner rotor of the TV control motor 1001 is also positive. Therefore, when the automobile makes normal differential left turning, the TV control motor 1001 does not input an electrical signal or output a torque; and the hollow shaft type inner rotor of the TV control motor is dragged by the torque vectoring device 2000 to rotate in the positive direction. A torque vectoring flow is shown in FIG. 6.

Similarly, when the automobile makes normal differential right turning, the TV control motor 1001 does not input an electrical signal or output a torque; and the hollow shaft type inner rotor of the TV control motor is dragged by the torque vectoring device 2000 to rotate in the negative direction. A torque vectoring flow is also shown in FIG. 6.

When the automobile is turned at medium and high speed, a torque on a wheel on an inner side should be vectored to a wheel on an outer side to increase turning maneuverability. If the rotating direction of the wheel during drive of the automobile is set as a positive direction, an opposite direction is a negative direction; and left turning of the automobile is taken as an example for making analysis. At this moment, a motor controller controls the TV control motor 1001 to output a positive torque $T_0$ ($T_0$ is a positive value); after the torque is increased by reducing speed by the TV reducing mechanism 1100, a moment inputted into the inner gear ring 1031 in the two-row planetary TV coupling mechanism 1200 is $iT_0$, wherein i is a transmission ratio of the TV reducing mechanism 1100. Thus, a moment inputted into the first half shaft 1402 by the sun gear 1034 in the first planetary gear train 1030 is $$-\frac{iT_0}{k}.$$

Then, a moment inputted into the inner gear ring 1051 of the single-row planetary differential coupling mechanism 1300 by the TV control motor 1001 is $$\frac{iT_0}{k}.$$

Therefore, the torque inputted into the first half shaft 1402 of the sun gear 1054 in the third planetary gear train 1050 is $$-\frac{iT_0}{kk_5},$$

and a moment inputted into the differential housing 1401 by the planet carrier 1053 is $$\frac{i(k_5+1)T_0}{kk_5}.$$

A moment which is equally vectored to the first half shaft 1402 and the second half shaft 1403 by the differential housing 1401 is $$\frac{i(k_5+1)T_0}{2kk_5}.$$

Therefore, the moment inputted into the first half shaft 1402 by the TV control motor 1001 is finally formed by a sum of three parts, i.e., the moment inputted into the first half shaft 1402 by the sun gear 1034 in the first planetary gear train 1030, the moment inputted into the first half shaft 1402 by the sun gear 1054 in the third planetary gear train 1050, and the moment equally vectored to the first half shaft 1402 by the differential housing 1401. The result of the moment is $$\frac{i(k_5+1)T_0}{2kk_5}.$$

The moment finally inputted into the second half shaft 1403 by the TV control motor 1001 is $$\frac{i(k_5+1)T_0}{2kk_5}.$$

Figure 7:
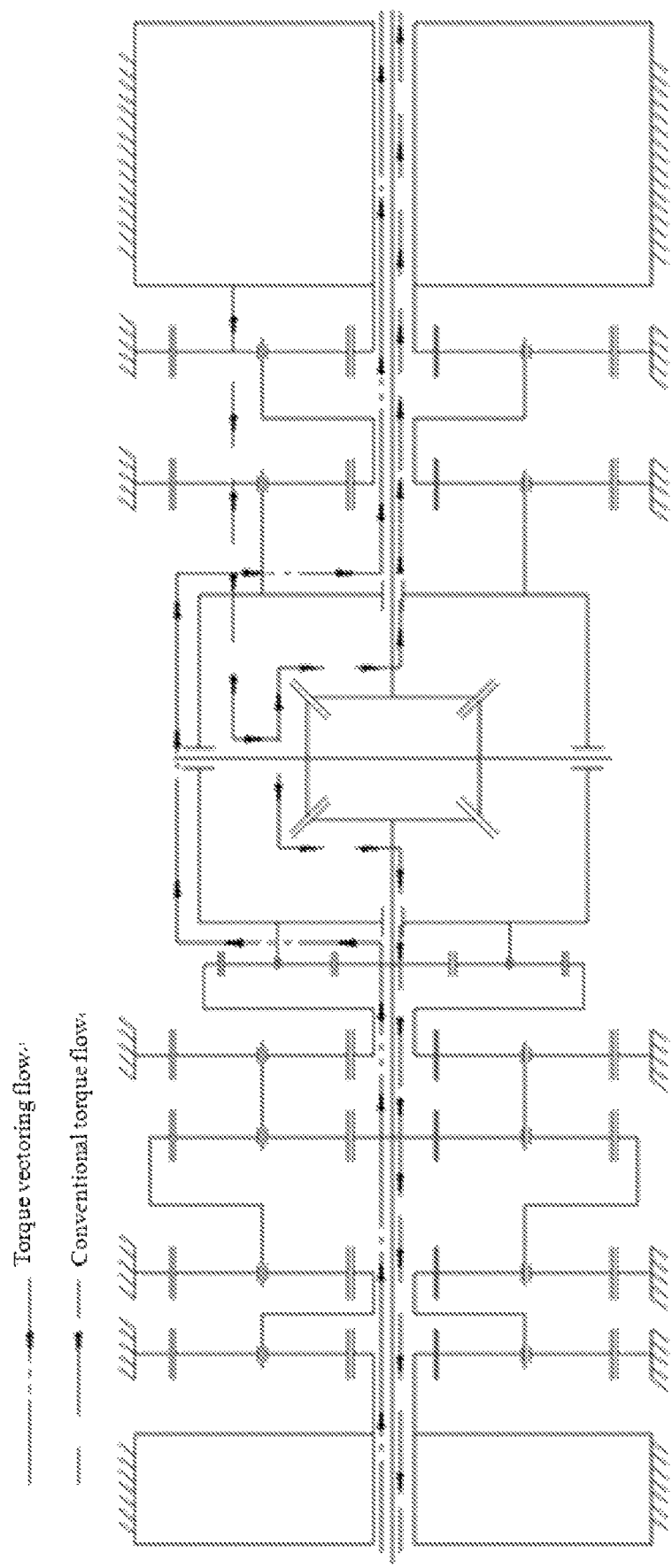
FIG. 7 is a schematic diagram of a torque flow direction of an electric differential with a torque vectoring function during left turning of an automobile and an operation of a torque vectoring device in the present invention.

It can be seen from the above that, the moment inputted into the first half shaft 1402 and the second half shaft 1403 by the TV control motor 1001 is equal and opposite in directions. Therefore, the total longitudinal drive torque is not changed; the torque of the wheel on the left side connected with the first half shaft 1402 is decreased; the torque of the wheel on the right side connected with the second half shaft 1403 is increased; a yawing moment contributing to left turning may be generated; the left-turning maneuverability of the automobile is increased. It should be indicated that, the rotation speed of the TV control motor 1001 at this moment is equal to the rotation speed when the automobile makes normal differential left turning. The torque vectoring flow is shown in FIG. 7. It should be indicated that, if the TV control motor outputs a negative torque at this moment, then the drive torque will be vectored from the wheel on the right side to the wheel on the left side, and a yawing moment that prevents over-steering of the vehicle is generated for maintaining automotive stability.

Figure 8:
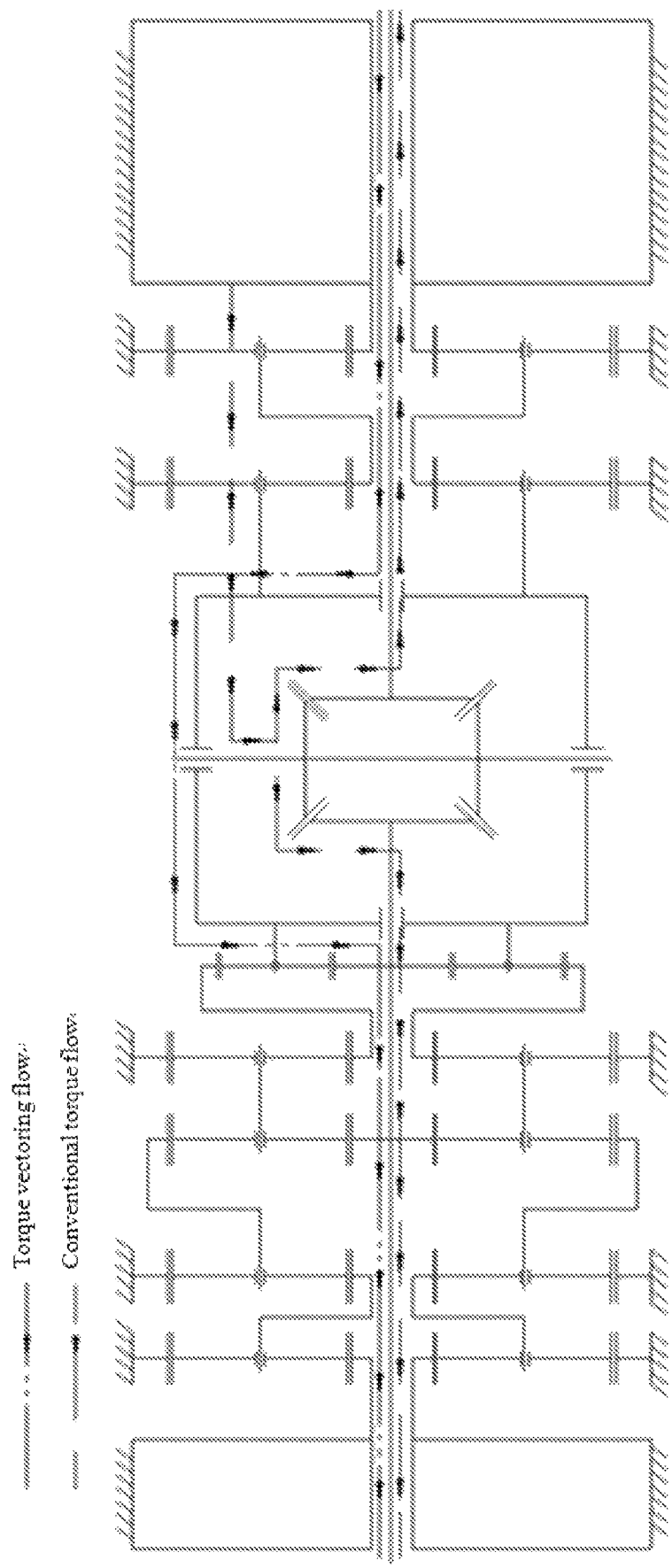
FIG. 8 is a schematic diagram of a torque flow direction of an electric differential with a torque vectoring function during right turning of an automobile and an operation of a torque vectoring device in the present invention.

Similarly, when the automobile turns right at medium and high speed, the motor controller controls the TV control motor 1001 to output a negative torque, and a yawing moment contributing to right turning may be generated on premise of not changing the total longitudinal drive torque, thereby enhancing the right-turning maneuverability of the automobile. It should be indicated that, the rotation speed of the TV control motor 1001 at this moment is equal to the rotation speed when the automobile makes normal differential right turning. The torque vectoring flow is shown in FIG. 8. It should be indicated that, if the TV control motor outputs a positive torque at this moment, then the drive torque will be vectored from the wheel on the left side to the wheel on the right side, and a yawing moment that prevents over-steering of the vehicle is generated for maintaining the automotive stability.

Although the embodiments of the present invention are disclosed above, the present invention is not only limited to applications listed in description and embodiments and is completely applicable to various fields suitable for the present invention. Additional modifications may be easily realized by those skilled in the art. Therefore, the present invention is not limited to specific details and illustrated and described figures herein on premise of not deviating from general concepts defined by claims and equivalent scopes.

We claim:

1. An electric differential with a torque vectoring function, comprising:
   a main drive mechanism arranged on one side of a differential, wherein an output end of the main drive mechanism is connected with a differential housing for transferring rotating power to the differential housing to drive a vehicle to run;
   a TV control drive mechanism arranged on the other side of the differential for outputting torque vectoring control power;
   a first single-row planetary gear train including a first sun gear, a first planetary gear, a first planet carrier and a first gear ring, wherein the first sun gear is coaxially and fixedly connected with a first half shaft, and the first gear ring is connected with an output end of the TV control drive mechanism;
   a second single-row planetary gear train including a second sun gear, a second planetary gear, a second planet carrier and a second gear ring, wherein the second gear ring is fixed to a drive axle housing, the second planet carrier is fixedly connected with the first planet carrier, and the second sun gear is rotatably supported on the first half shaft; and
   a third single-row planetary gear train including a third sun gear, a third planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein
   the second single-row planetary gear train and the first single-row planetary gear train have a same diameter.

2. The electric differential with a torque vectoring function according to claim 1, wherein the TV control drive mechanism comprises a TV control motor and a TV reducing mechanism.

3. The electric differential with a torque vectoring function according to claim 2, wherein the TV control motor comprises a hollow output shaft; and the first half shaft is rotatably supported on the hollow output shaft and penetrates out of the hollow output shaft.

4. The electric differential with a torque vectoring function according to claim 2, wherein TV reducing mechanism comprises:
   a fourth single-row planetary gear train including a fourth sun gear, a fourth planetary gear, a fourth planet carrier and a fourth gear ring, wherein the fourth sun gear is fixedly connected with the hollow output shaft, and the fourth gear ring is fixed to the drive axle housing; and
   a fifth single-row planetary gear train including a fifth sun gear, a fifth planetary gear, a fifth planet carrier and a fifth gear ring, wherein the fifth sun gear is fixedly connected with the fourth planet carrier, the fifth gear ring is fixed to the drive axle housing, and the fifth planet carrier is a control output end that is connected with the first gear ring.

5. The electric differential with a torque vectoring function according to claim 1, wherein the main drive mechanism comprises a main drive motor and a main reducing mechanism.

6. The electric differential with a torque vectoring function according to claim 5, wherein the main drive motor comprises a hollow output shaft; and a second half shaft is rotatably supported on the hollow output shaft and penetrates out of the hollow output shaft.

7. The electric differential with a torque vectoring function according to claim 5, wherein the main reducing mechanism comprises:
   a seventh single-row planetary gear train including a seventh sun gear, a seventh planetary gear, a seventh planet carrier and a seventh gear ring, wherein the seventh sun gear is fixedly connected with an output shaft of the main drive motor, and the seventh gear ring is fixed to the drive axle housing; and
   a sixth single-row planetary gear train including a sixth sun gear, a sixth planetary gear, a sixth planet carrier and a sixth gear ring, wherein the sixth sun gear is fixedly connected with the seventh planet carrier, the sixth gear ring is fixed to the drive axle housing, and the sixth planet carrier is fixedly connected with the differential housing.

8. An electric differential with a torque vectoring function, comprising:
- a main drive mechanism arranged on one side of a differential, wherein an output end of the main drive mechanism is connected with a differential housing for transferring rotating power to the differential housing to drive a vehicle to run;
- a TV control drive mechanism arranged on the other side of the differential for outputting torque vectoring control power;
- a first single-row two-stage planetary gear train including a first sun gear, a first two-stage planetary gear, a first planet carrier and a first gear ring, wherein the first sun gear is coaxially and fixedly connected with a first half shaft, and the first gear ring is connected with an output end of the TV control drive mechanism;
- a second single-row two-stage planetary gear train including a second sun gear, a second two-stage planetary gear, a second planet carrier and a second gear ring, wherein the second gear ring is fixed to a drive axle housing, the second planet carrier is fixedly connected with the first planet carrier, and the second sun gear is rotatably supported on the first half shaft; and
- a third single-row planetary gear train including a third sun gear, a third planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein
- the second single-row two-stage planetary gear train and the first single-row two-stage planetary gear train have a same diameter.

9. An electric differential with a torque vectoring function, comprising:
- a main drive mechanism arranged on one side of a differential, wherein an output end of the main drive mechanism is connected with a differential housing for transferring rotating power to the differential housing to drive a vehicle to run;
- a TV control drive mechanism arranged on the other side of the differential for outputting torque vectoring control power;
- a first single-row planetary gear train including a first sun gear, a first planetary gear, a first planet carrier and a first gear ring, wherein the first sun gear is coaxially and fixedly connected with a first half shaft, and the first gear ring is connected with an output end of the TV control drive mechanism;
- a second single-row planetary gear train including a second sun gear, a second planetary gear, a second planet carrier and a second gear ring, wherein the second gear ring is fixed to a drive axle housing, the second planet carrier is fixedly connected with the first planet carrier, and the second sun gear is rotatably supported on the first half shaft; and
- a third single-row two-stage planetary gear train including a third sun gear, a third two-stage planetary gear, a third planet carrier and a third gear ring, wherein the third sun gear is coaxially and fixedly connected with the first half shaft, the third gear ring is fixedly connected with the second sun gear, and the third planet carrier is fixedly connected with the differential housing, wherein
- the second single-row planetary gear train and the first single-row planetary gear train have a same diameter.

* * * * *